July 23, 1929.   H. A. DARRIN   1,721,875

CARRIAGE BODY SYSTEM FOR AUTOMOBILES AND OTHER VEHICLES

Filed Jan. 25, 1927   2 Sheets-Sheet 1

Inventor.
Howard A. Darrin
by Connolly Bros.
Attys.

July 23, 1929.  H. A. DARRIN  1,721,875
CARRIAGE BODY SYSTEM FOR AUTOMOBILES AND OTHER VEHICLES
Filed Jan. 25, 1927  2 Sheets-Sheet 2
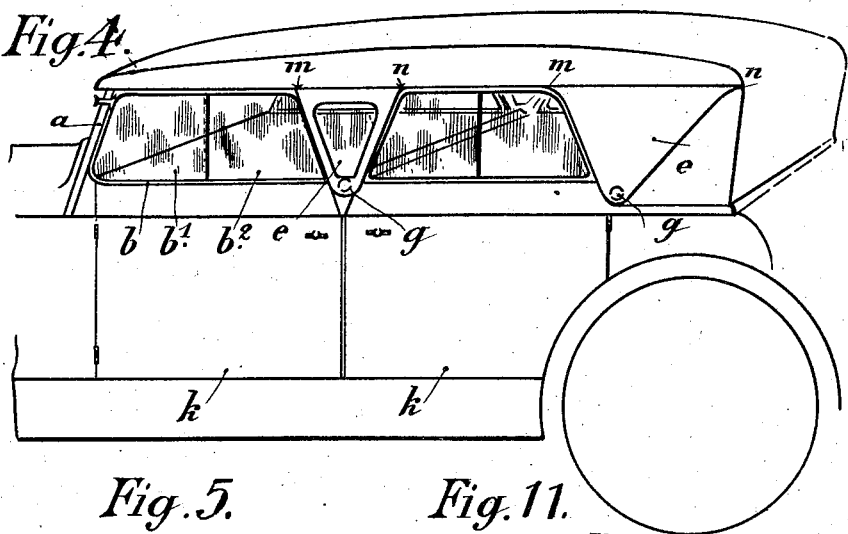
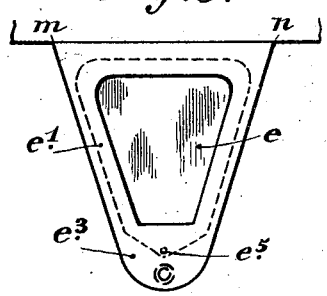
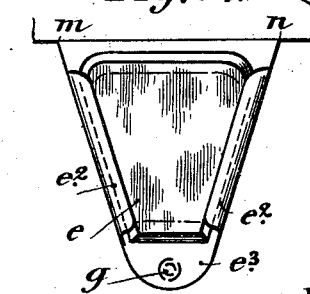
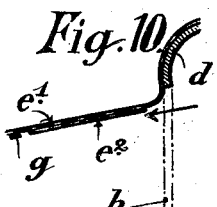
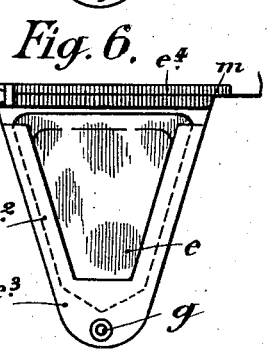
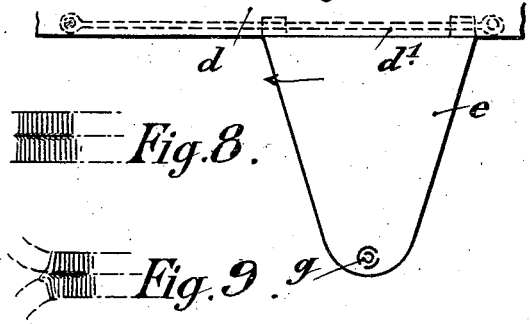
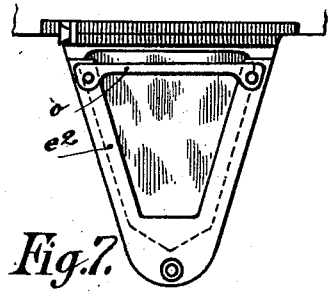
Inventor,
Howard A. Darrin,
by Connolly Bros.
Attys Patented July 23, 1929.

1,721,875

UNITED STATES PATENT OFFICE.

HOWARD A. DARRIN, OF PARIS, FRANCE.

CARRIAGE-BODY SYSTEM FOR AUTOMOBILES AND OTHER VEHICLES.

Application filed January 25, 1927, Serial No. 163,461, and in France August 28, 1926.

This invention relates to improvements in convertible, open-to-closed bodies for automobiles and other vehicles of the kind, having a movable or folding top or canopy, such improvements enabling a carriage or the like to be obtained which is completely closed, of the nature of a torpedo body, and with which the parts may be easily folded without any other manœuvres than those usually required for the simple folding of the usual top or canopy, so as to obtain rapidly and according to requirements a closed carriage or an uncovered carriage with its wind shields.

The invention is more especially intended and adapted for automobile vehicles of the type provided with a forward or front wind shield and having one or more doors on each side of the vehicle, such doors being provided, each, with one or more glass plates or panes, either fixed or movable with reference to the doors. In vehicles of this class, there generally occurs a separation between the laterally situated glass plates or panes of the rear door and the top or canopy of the vehicle as well as between the glass panes or plates of the front and rear doors, either by reason of the distance between the two doors on each side in vehicles of extra length or because the glass plates or panes are of trapezoidal form as is particularly the case with vehicles having a wind shield in the rear part of the vehicle as well as a wind shield in front. For the purpose of closing these lateral openings or spaces it has already been proposed to employ glass plates, panes or screens, fixed upon the vehicle or capable of being concealed by the frame work of the vehicle or by the doors when not in use. All such means for closing the spaces or openings have been complicated, costly and unattractive.

The present invention has for its object the provision of a particular system and means for the closing of the laterally situated openings or spaces referred to and consists in the formation upon, attachment to or association with the top or canopy of the vehicle or laterally arranged appendages having exactly the form of the openings or spaces to be filled, and which, when properly arranged may be attached to the vehicle and held in place by simple and effective fastening means. In restoring the vehicle top or canopy from a closed to an open position these appendages may be disposed of without requiring other than the manipulation of the simple fastening means. It is to be noted that by the use of the invention the closing and opening of the vehicle may be accomplished with the maximum of rapidity and that when the vehicle is open, the top or canopy being folded back, the appearance of the vehicle is attractive by reason of the unity and simplicity of parts while when the vehicle is closed, i. e. with the top or canopy lowered, the vehicle is rendered practically air and water tight and presents the appearance of a permanently closed body similar to a sedan, landeau or like type.

In this way there is obtained with a single carriage, all the advantages of two kinds of carriages—covered and uncovered—without any supplementary transformation or manipulation.

The invention is shown by way of example on the accompanying drawing, in which:

Fig. 4 is a complete view of a torpedo body constructed according to the same principle with side screens and provided with an auxiliary immovable device which may comprise a flexible or rigid triangular frame for a transparent sheet of the same shape.

Fig. 5 is a detail to a larger scale of the auxiliary device itself as seen from the outside.

Fig. 6 is a view corresponding to Fig. 2 showing the same auxiliary device viewed from the interior with means for rapid connection to the folding top or canopy.

Fig. 7 is a modification of the framework or casing shown in Fig. 6.

Figs. 8 and 9 are diagrams showing the functioning of a known device for rapid connection by the mutual interlocking of two portions to be connected.

Fig. 10 is a diagram showing the position when raised to be given to the auxiliary device for inserting or removing the transparent sheet into or from its slideway if the said sheet is not removable.

Fig. 11 is a modification of Fig. 5.

Fig. 12 is a modification of the method of attachment permitting of the displacement of the auxiliary device forwards or backwards by means of slides extending along a guide rod fixed to the hood.

Figure 1:
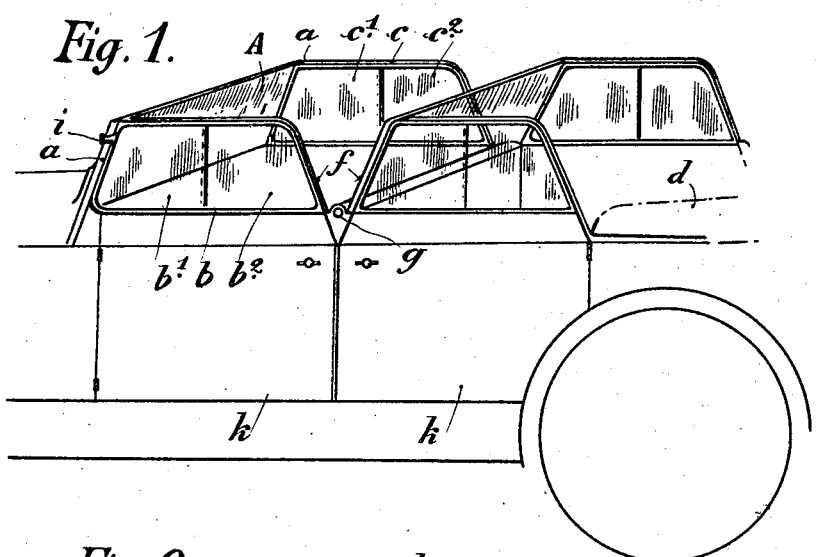
Fig. 1 is a perspective view showing the uncovered carriage, that is to say with the top or canopy folded.
Figure 2:
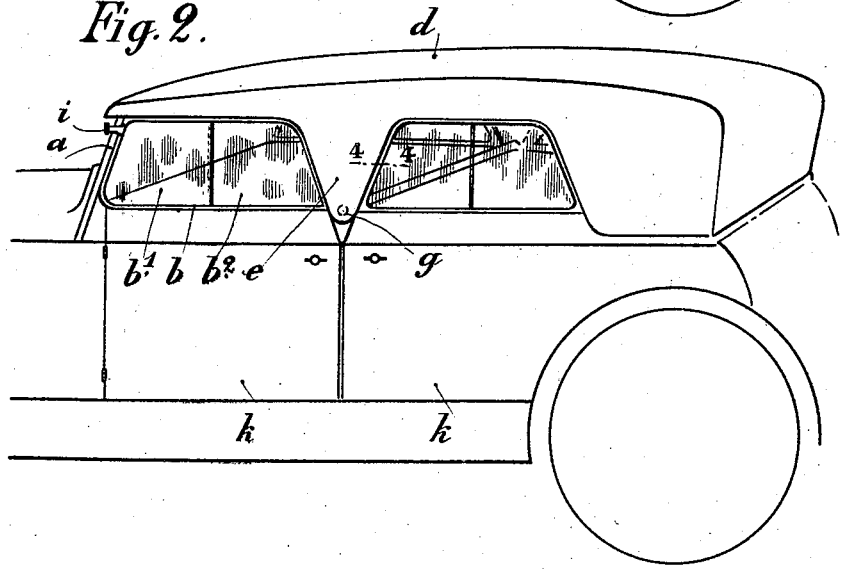
Fig. 2 is a similar view showing the carriage closed.
Figure 3:
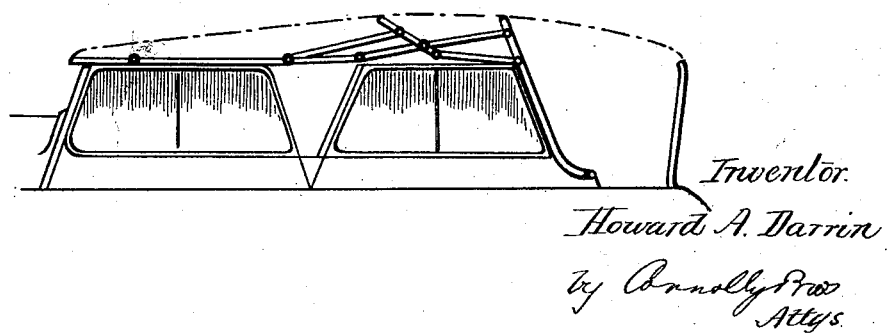
Fig. 3 is a diagrammatic view of the system of hinged supports, of known construction, but connected to the side screens of the carriage.

Referring to the drawings, A represents the front windshield, supported for instance between two standards $a$, fixed and integral with the carriage body.

$b$ and $c$ are two side frames for sheets which may be in fixed connection with the doors $k$ of the vehicle.

As shown in the drawing each of these sheets may be divided into two parts; a fixed part $b'$ or $c'$ as the case may be and a laterally sliding part $b^2$ or $c^2$, the pushing out of the way of the movable part being arranged principally for use in the case of the closed vehicle.

The rear shield is identical to the front wind shield, as also the frames and lateral sheets which may also be in one or not with a second door.

Without departing from the principle of the invention it would be possible of course as a modification to do without the rear screen whilst retaining only the side screens, of which the frames might also be joined and provided with reinforcing members to ensure their rigidity.

The folding top or canopy $d$ which is of the usual construction is connected for use to the standard or to the chassis or frame of the wind screen by any locking means. According to my invention this top or canopy is provided at the sides with one or a plurality of supplementary elements $e$, shaped according to the openings $f$ remaining between the lateral sheets or screens. The auxiliary elements will, by preference, and as shown on the drawing, be of triangular formation so as to be rigidly attached to the casing by means of one or more attachment devices $g$, such as a press button located at the lower angle of the triangle.

A supplementary hinge $i$ may in a well known manner be added to complete the jointing of the door $k$ and its connection with the wind shield.

The drawing shows by way of example a torpedo body, but it is of course to be understood that the invention may be applied to all kinds of transformable carriage bodies.

An important constructional embodiment is shown in Figs. 4 to 13.

It consists essentially of a special construction of the supplementary element or part interposed between two adjoining side screens or between one of them and the back of the top or canopy, and is shaped according to the openings to be closed.

These supplementary devices which will be preferably but not necessarily of triangular shape may be removable, that is to say not fixed wholly or partly to the top or canopy. They may be hinged, hooked or slidable upon the top or canopy of the carriage.

According to another feature of the invention they may also themselves include one or a plurality of constructional parts such as a flexible or rigid frame enclosing a sheet or other transparent substance which may or may not be coloured.

In this way, the supplementary element $e$ is connected to the flexible top or canopy $d$ in an immovable manner on the line $m$—$m$ by some appropriate system such as automatic press buttons or hooks as in the case of the known arrangement represented diagrammatically at Figs. 8 and 9. This arrangement allows for the pivoting, on the line $n$—$g$ for instance of the auxiliary member $e$, to obtain from the interior momentary opening between the frames $b$ of the side sheets.

The fixed supplementary member may comprise (as in the example shown at Figs. 4 to 6) a framework $e'$ which may be flexible or rigid, provided with guide ways $e^2$ to receive a sheet $e^6$. A cross strut $o$ may also be provided to interconnect the two slides $e^2$ at their upper ends, as shown at Fig. 7. The lower portion $e^3$ of the supplementary member carries a fastening which can be rapidly attached at $g$, such for instance as a press button, and the upper portion $n$—$n$ is provided with a resilient coupling device $e^4$ on the hood $d$.

A small opening $e^5$ may also be provided for the evacuation of rain water which might accumulate at the bottom of the frame.

The putting into place of the glass or sheet $e^6$ may be effected from the interior, as shown at Fig. 10 or from the exterior as shown in Figure 11.

The supplementary member $e$ might also be so constructed as to slide towards the front or back upon one or more appropriate guides such as a rod $d'$ fixed to the hood $d$.

When, in order to obtain an uncovered carriage, it is desired to fold back the top or canopy of the carriage, the screen $e$ may be raised if so desired and the frame $e^2$ $e^3$ alone may remain connected to the hood in this operation.

The engagement of the screen or sheet $e$ might also be combined with the attachment member $g$, for instance with the intervention of a spring hook, pin, or safety bolt or the like.

When the carriage is covered, if it is desired to provide an opening between the side screens, a second member may be provided, such for instance as a press button, fixed under the folding top or canopy or other covering device so as to fold back the supplementary element on the interior and to attach it to the press button on the inside.

What I claim and desire to secure by Let- ters Patent of the United States of America is:—

1. A vehicle of the automobile type, having a folding top provided with supplementary, laterally arranged appendages for closing openings in the upper part of the vehicle, when the top or canopy is lowered, such appendages being adjustable lengthwise of the vehicle and carried by guiding slides.

2. The combination with the body of an automobile vehicle, having fore and aft doors, surmounted by trapezoidal windows, and having rearwardly inclined wind shields, of a folding top having suspended from its side, flexible appendages of triangular contour adapted to fill the spaces between the windows, and to be folded inwardly against, and supported by, the roof of the top, said appendages being provided with means at their lower apexes for attachment to the body of the vehicle.

In witness whereof I affix my signature.

HOWARD A. DARRIN.